June 9, 1959   R. C. COOPRIDER   2,889,964
DISPENSER PUMP
Filed March 14, 1956
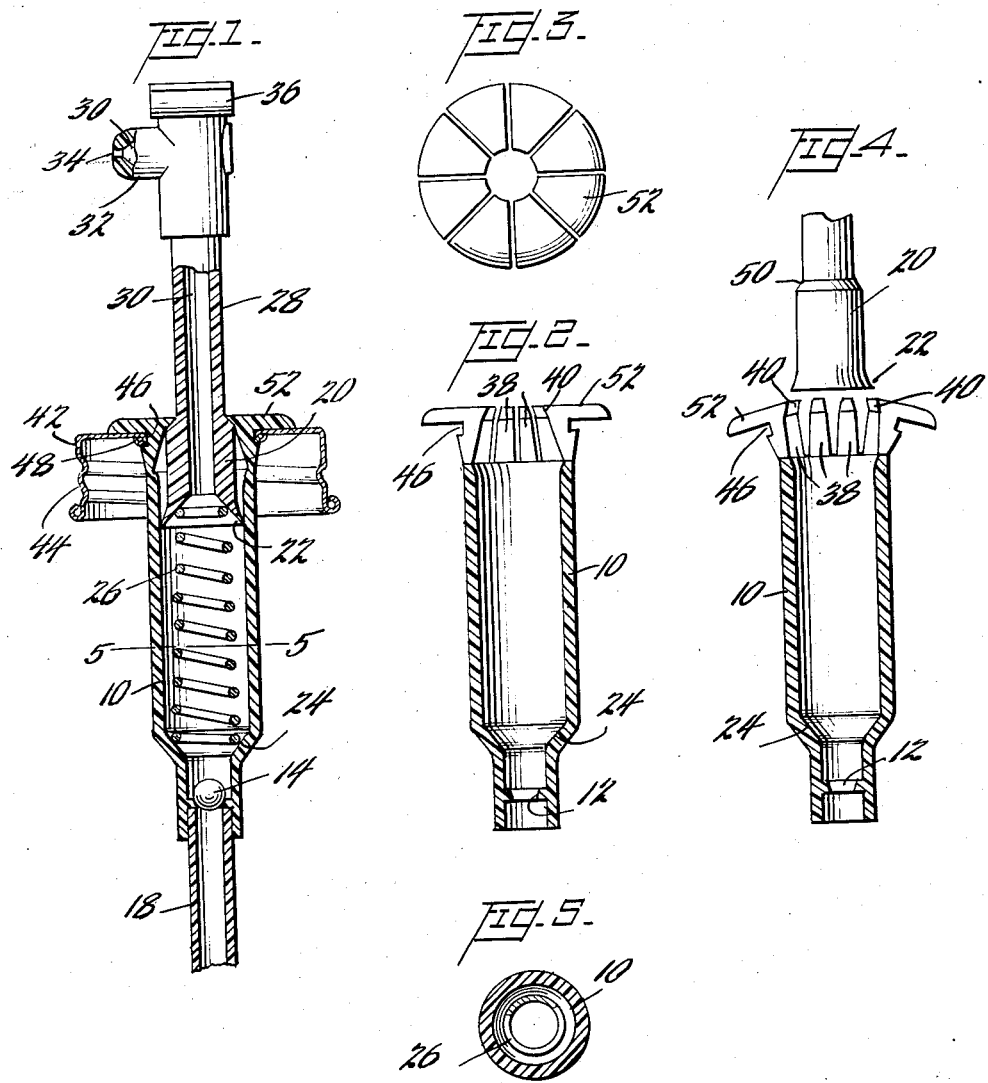
INVENTOR
Rex C. Cooprider
BY Watson, Cole, Grindle & Watson,
ATTORNEYS

United States Patent Office 2,889,964
Patented June 9, 1959

2,889,964

DISPENSER PUMP

Rex C. Cooprider, Downey, Calif., assignor to The Drackett Company, Cincinnati, Ohio, a corporation of Ohio Application March 14, 1956, Serial No. 571,488

6 Claims. (Cl. 222—321)

This invention relates to a reciprocating type fluid pump particularly adapted for use as a dispensing element for association with a portable fluid container, though capable of more general use.

The usual construction of such pumps has heretofore been such that it has been necessary to form the pump cylinder or barrel with a separable annular cylinder head or flange for preventing retraction of the piston from the cylinder and for providing an annular seal or packing around the piston rod. Such a cylinder head could be applied to the cylinder only after insertion of the plunger within the cylinder. Similarly, the fluid outlet head or nozzle and/or the actuating finger piece customarily carried by the piston rod have been formed separately from the rod and capable of application thereto only after assembly of the plunger and its rod within the cylinder. This has necessitated a multiplicity of parts and of assembling operations.

In the present invention, the foregoing disadvantages are eliminated by forming the cylinder head as a plurality of integral segments of the cylinder, and of variable diameter to permit reception of the piston when radially expanded and, when thereafter radially contracted, to overlie and limit upward movement of the piston. In its radially contracted position, adjoining segments may form a composite flange having its inner periphery in wiping engagement with the piston rod.

It is an important feature of the invention that the piston, the piston rod, the dispensing head or nozzle, and the finger piece for reciprocating the piston, may be either formed as an integral unit, or preassembled as a unit, prior to assembly with the pump cylinder. Thus, the number of parts and the number of assembly steps involved in producing the pump, may be substantially reduced, with consequent savings.

This end is achieved by forming the pump cylinder of a somewhat flexible or deformable material, such as polyvinyl, having one end portion thereof slotted axially to form a plurality of radially deflectible fingers. Adjacent their free ends such fingers are formed with inwardly projecting segments of a cylinder head or inner flange which may have the piston inserted therethrough when radially expanded, to thereafter be brought together in contracted relation above the piston and about the piston rod. The fingers may advantageously be formed to normally diverge axially, thus normally maintaining said segments expanded for easy reception of the piston.

In accordance with a further important feature of the invention, the piston and piston rod assembly and the cylinder or barrel of the pump are secured and maintained in operative relation by a novel mechanical interlocking of parts, and without the necessity for cement, solvents or other conventionally used securing means. To this end, annular means which may conveniently comprise an apertured closure cap, is applied externally about the fingers to radially confine them. Preferably, the fingers are formed externally with an annular groove for reception of the periphery of the annular means, to axially position the cylinder in said cap.

A further feature consists in providing the fingers adjacent their free ends with segments of an external flange, at one side of the said annular groove, to be brought into contiguous relation by the confining action of the cap and to be flush against the surface of the cap in substantially sealing relation.

A further incidental advantage arising from the slotted construction of the cylinder end consists in so arranging the slots that air seeping into the upper end of said cylinder between the cylinder head segments or flange and the piston rod will be vented into the interior of a container associated with the pump to replace the liquid delivered from said pump.

In the preferred embodiment of the invention illustrated in the accompanying drawings:

Figure 1 is a view, partly in section, showing the preferred exemplification of the invention, a portion only of the suction tube being shown;

Figure 2, an axial section through the pump cylinder with its upper end constricted, as in Figure 1;

Figure 3, a plan view of the cylinder;

Figure 4, an axial section through the cylinder, with its upper end in its expanded condition for reception of the piston; and, Figure 5, a section on the line 5—5 of Figure 1.

Referring in detail to the accompanying drawings, the fluid pump therein illustrated comprises a pump cylinder 10 of a flexible or deformable material, preferably consisting of a flexible plastic material such as polyvinyl, having an axial intake port 12 at its lower end. A ball check valve 14 cooperates with and controls the port 12 to prevent a backflow of fluid therethrough from the cylinder 10. A suction tube 18 which may be of any suitable material, including either a plastic material or metal is inserted in the lower end of the cylinder 10 in communication with the port 12 therein.

Disposed for reciprocation within the cylinder 10 is a piston 20 having a downwardly and preferably radially outwardly flaring lip 22 which functions as a piston ring or packing in sliding engagement with the interior walls of the cylinder 10. Disposed within the cylinder under compression between the lower end of the piston 20 and an annular shoulder 24, constituting an upwardly presented abutment within the cylinder adjacent its lower end, is a conventional coil spring 26. It will be seen that the spring 26 cooperates with the piston 20 to urge the piston upwardly on its suction stroke in conventional manner. Rigidly connected to the piston 20 and projecting coaxially therefrom through the upper end of the cylinder is a piston rod 28, it being noted that the discharge passage 30 extends through the lower end of the piston and coaxially up through the piston rod to a suitable point of discharge.

Also means may be associated with the discharge passage in conventional manner for substantially preventing backflow of the fluid therefrom into the cylinder. In the present instance, such backflow preventing means comprises a discharge nozzle 32 carried at the upper end of the piston rod 28 and formed with a constricted discharge orifice 34 which preferably opens in a lateral direction substantially at right angles to the discharge passage 30 and communicates with the passage 30.

In this specific arrangement, it will be seen that the discharge orifice 34 is of considerably smaller diameter than the port 12 through which the fluid flows into the cylinder 10, and the comparatively larger diameter of the piston 20 is such that on its upward stroke under the pressure of spring 26 only a comparatively small amount of air can enter the orifice 34. Thus the upward movement of the piston may create a partial vacuum within the cylinder to draw fluid upwardly into the cylinder through the suction tube 18 and the port 12.

This specific arrangement is especially advantageous where the head 32 constitutes a spray-type head which normally employs a quite small orifice 34, and is advantageous in that it permits the elimination of the usual ball valve arranged in the discharge passage 30 in accordance with usual practice and substantially as illustrated in the United States patent to Rath, 170,592, of November 30, 1875. However, the present invention by no means precludes the use of such a conventional ball valve or check valve arrangement within the passage 30, but may include such a valve regardless of whether a spray head is employed at the upper end of the piston rod 28.

Also carried by the piston rod 28, preferably on the discharge nozzle or head 32, is an upwardly presented finger piece 36 for facilitating manual actuation of the pump by downward finger pressure on such finger piece.

The structure thus far described is of a more or less conventional nature and the novel features of the invention are as hereinafter described. In particular, it will be noted that the upper end of the pump cylinder or barrel 10 is axially slotted to form a plurality of free ended resilient fingers 38 which preferably are arranged to diverge upwardly prior to assembly with the piston, for facilitating insertion of the piston within the cylinder. However, such upwardly diverging relation of these fingers 38 is not essential to the invention, considered from its broader aspect.

Radially inwardly disposed projections or segments 40, adapted to conjointly define an annular internal flange or cylinder head, are carried near the free ends of the respective fingers 38. The arrangement is such that annular means encircling the fingers 38 may confine them and their respective flange segments 40 in substantially contiguous formation. Such a confining means may advantageously comprise a circularly apertured container closure cap 42 which, in the embodiment shown, is formed of metal having a skirt internally threaded at 44 for application to the threaded neck of a bottle or other container in usual manner. Obviously, in place of the apertured cap 42 other annular confining means may be employed. Preferably the fingers 38 are formed exteriorly to define an annular groove 46 for receiving the inner edge or periphery of the confining means 42 and axially positioning the cylinder with regard to such confining means. Where the cap 42 is formed of sheet metal as shown, it will be found desirable to form its inner periphery as an annular rolled edge 48 in order to facilitate its application to the cylinder and fingers and in order to avoid cutting the latter. The cap 42, when applied to a container, in usual manner, may operatively support the pump for discharging of the container contents.

In the above-described arrangement of the piston 20 within the cylinder 10, with the confining means 42 applied to the cylinder, it will be seen that the flange segments 40 conjointly define an annular flange overhanging the shoulder 50 of the piston at its juncture with the piston rod and preventing retraction of the piston from the cylinder. Also preferably the inner periphery of such flange defined by the segments 40 is disposed in snug wiping engagement with the piston rod 28.

Where the pump is to be used in association with a container cap 42, as shown, it is desirable to provide also a plurality of outer flange segments 52 carried by the respective fingers 38 above and contiguously to the groove 46 for disposition in substantially sealing relation with the closure cap 42 around its aperture. It will be apparent that the normally outward divergence of these fingers 38 will function advantageously to urge them into sealing engagement with the periphery of the aperture.

Since the slots between the fingers 38 will not be closed quite so completely beneath the periphery of the aperture within the cap 42, as at locations within the plane of the periphery, such slots beneath the internal periphery of the cap may function to vent the upper end of the cylinder to the interior of a container associated with the cap to prevent the formation of an air lock above the piston 20. In addition, such slots may permit ingress to the container of air seeping inwardly between the piston rod 28 and the annular wiping flange made up of the flange segments 40, to the end that such inwardly seeping air may replace the fluid withdrawn from the container by the pump cylinder 10.

By virtue of the foregoing arrangement, the piston 20 and piston rod 28, as well as the enlarged discharge nozzle 32 and finger piece 36, may, if desired, be formed as an integral unit, from a plastic material such as polyethylene, by usual plastic casting or molding operations. The cylinder 10 may similarly be formed as an integral unit, from a relatively flexible material such as polyvinyl.

In assembling the several parts of the pump, after inserting the ball valve 14 and spring 26, the piston 20 and its rod 28 are inserted axially into the cylinder 10, through the radially outwardly flaring end as defined by the axially diverging fingers 38 in Figure 4. Preferably the fingers 38 will normally diverge sufficiently that the inner peripheral edges of the projections 40 are positioned on an imaginary circle of greater diameter than the piston 20, to facilitate reception of the piston within the cylinder.

Thereafter, the lower end of the cylinder 10, with the piston 20 and piston rod 28 therein, is inserted downwardly through the aperture cap or confining element 42 until the inner periphery, as defined by the rolled edge 48 of the latter, seats within the annular groove 46 around the fingers, to be thus retained against axial displacement.

Application of the cap 42 in this manner will urge inwardly and radially confine the fingers 38, bringing both the inner and outer flange segments 40 and 52 respectively into contiguous relationship to define annular flanges or seals. The inner flange 40 will thus overlie and limit upward movement of the piston 20 and, in addition, its inner periphery will preferably be disposed in wiping engagement with the piston rod 28.

The outer flange 52 will snugly engage the upper face of the closure cap 42 around the aperture therein, to prevent the escape of fluid from a container associated with the cap.

It will obviously be immaterial whether the suction tube 18 is applied to the cylinder 10 before or after the cap 42 and cylinder are assembled.

Although the cap 42 has been shown by way of exemplifying a radial confining means for the fingers 38, it is obvious that other confining means may be employed, or that the cylinder might be inserted directly into the dispensing opening of a container, the periphery of the opening in such case functioning as the confining means.

In use of the pump, the finger piece is alternately depressed by finger pressure and released to rise by the action of spring 26, whereby the pump will function in usual manner to suck fluid up through the tube 18 and into cylinder 10 on the upstroke of piston 20, and to expel such fluid through the discharge passage 30 and nozzle 32, on the downstroke of piston 20.

In this application I have shown and described only the preferred embodiment of the invention, simply by way of setting forth the best mode contemplated by me of carrying out my invention. However, it will be readily apparent that the invention may assume other embodiments and that its several details may be altered in various ways. Accordingly, the drawings and description herein are merely illustrative in nature and not restrictive.

Having thus described my invention, I claim:
1. A reciprocating fluid pump comprising a pump cylinder adapted for generally vertical disposition, a piston disposed for reciprocation in said cylinder, a piston rod of uniform diameter smaller than that of the piston projecting coaxially from the piston and reciprocable through the upper end of the cylinder, said cylinder comprising a plurality of upwardly free ended fingers formed integrally with said cylinder at its upper end, the free ends of said fingers being radially deflectible, said fingers having radially inward projections carried at the free ends thereof for radial deflection with said free ends, said fingers at their junctures with said cylinder being spaced radially from the axis of said cylinder at least to the same extent as the interior of said cylinder, annular means encircling the free ends of said fingers and radially confining same, said projections in the confined relation of said free ends overhanging and limiting upward movement of said piston.

2. The combination of claim 1 wherein said inward projections conjointly define an annular flange having its inner periphery in snug wiping engagement with said piston rod.

3. A reciprocating fluid pump comprising a pump cylinder of slightly resilient material having an axial intake port at its lower end, and a check valve controlling said port to prevent backflow of fluid therethrough, a suction tube communicating with said port, a piston disposed for reciprocation in said cylinder, said cylinder being formed interiorly with an upwardly presented abutment adjacent its lower end, spring means within said cylinder compressed between said abutment and the piston for urging the piston upwardly on its suction stroke, a piston rod of smaller diameter than the piston projecting coaxially therefrom through the upper end of the cylinder means defining a fluid discharge passage communicating with said cylinder, and means associated with said passage for substantially preventing backflow of fluid therein said discharge passage defining means comprising the piston rod and piston and the said passage extending axially therethrough, whereby the downward compression stroke of the piston will discharge the cylinder contents through said passage, and said backflow preventing means comprising a discharge nozzle carried by the piston rod and having a constricted discharge orifice in communication with the passage, an upwardly presented fingerpiece being carried by said nozzle for facilitating manual actuation of the pump, the upper end of said cylinder being axially slotted to form a plurality of free ended resilient fingers, said fingers being radially deflectible at their free ends and normally tending to diverge upwardly prior to assembly with the piston for facilitating the insertion therein of the piston, radially inwardly projecting flange segments carried at the free ends of the respective fingers, said fingers at their juncture with said cylinder being spaced radially from the axis of said cylinder to at least the same extent as the interior of said cylinder, and annular means normally encircling the free ends of said fingers and radially confining same in substantially contiguous cylindrical formation.

4. A reciprocating fluid pump comprising a pump cylinder of slightly resilient material having an axial intake port at its lower end, and a check valve controlling said port to prevent backflow of fluid therethrough, a suction tube communicating with said port, a piston disposed for reciprocation in said cylinder, said cylinder being formed interiorly with an upwardly presented abutment adjacent its lower end, spring means within said cylinder compressed between said abutment and the piston for urging the piston upwardly on its suction stroke, a piston rod of smaller diameter than the piston projecting coaxially therefrom through the upper end of the cylinder (means defining a fluid discharge passage communicating with said cylinder, and means associated with said passage for substantially preventing backflow of fluid therein) said discharge passage defining means comprising the piston rod and piston and the said passage extending axially therethrough, whereby the downward compression stroke of the piston will discharge the cylinder contents through said passage, and said backflow preventing means comprising a discharge nozzle carried by the piston rod and having a constricted discharge orifice in communication with the passage, an upwardly presented fingerpiece being carried by said nozzle for facilitating manual actuation of the pump, the upper end of said cylinder being axially slotted to form a plurality of free ended resilient fingers normally tending to diverge upwardly prior to assembly with the piston for facilitating the insertion therein of the piston, radially inwardly projecting flange segments carried adjacent the free ends of the respective fingers, annular means normally encircling said fingers and radially confining same in substantially contiguous cylindrical formation, said fingers being formed externally to define an annular groove for receiving said confining means and axially positioning the cylinder therein, said confining means comprising a circularly apertured container closure cap for receiving and confining said fingers within the circular aperture thereof, said flange segments being shaped and proportioned to conjointly define an annular flange overhanging and preventing retraction of said piston from the cylinder and with the inner periphery of said flange in snug wiping engagement with said piston rod, and a plurality of outer flange segments carried by the respective fingers contiguously to said groove for disposition in substantially sealing relation with said closure cap around its said aperture.

5. A reciprocating fluid pump comprising a pump cylinder of slightly resilient material having an axial intake port at its lower end, and a check valve controlling said port to prevent backflow of fluid therethrough, a piston disposed for reciprocation in said cylinder, spring means within said cylinder for urging the piston upwardly on its suction stroke, a piston rod of smaller diameter than the piston projecting coaxially therefrom through the upper end of the cylinder, means defining a fluid discharge passage communicating with said cylinder, and means associated with said passage for substantially preventing backflow of fluid therein, whereby the downward compression stroke of the piston will discharge the cylinder contents through said passage, the upper end of said cylinder being axially slotted to form a plurality of free ended resilient radially deflectible fingers normally tending to diverge upwardly prior to assembly with the piston for facilitating the insertion therein of the piston, radially inwardly projecting flange segments carried adjacent the free ends of the respective fingers, annular means normally encircling said fingers and radially confining same in substantially contiguous cylindrical formation, said fingers being formed externally to define an annular groove for receiving said confining means and axially positioning the cylinder therein, said confining means comprising a circularly apertured container closure cap for receiving and confining said fingers within the circular aperture thereof, said flange segments being shaped and proportioned to conjointly define an annular flange overhanging and preventing retraction of said piston from the cylinder and with the inner periphery of said flange in snug wiping engagement with said piston rod, and a plurality of outer flange segments carried by the respective fingers contiguously to said groove for disposition in substantially sealing relation with said closure cap around its said aperture, said slots serving to vent the upper end of said cylinder to a container associated with said cap and also permitting ingress to said container of air seeping inwardly past said annular flange to replace the fluid withdrawn by said pump.

6. A reciprocating fluid pump comprising a pump cylinder adapted for generally vertical disposition, a piston disposed for reciprocation in said cylinder, a piston rod of uniform diameter smaller than that of the piston projecting coaxially from the piston and reciprocable through the upper end of the cylinder, said cylinder comprising a plurality of upwardly free-ended radially deflectible fingers formed integrally with said cylinder at its upper end, certain of said fingers having radially inward projections carried adjacent the free ends thereof, annular means encircling said fingers adjacent their free ends and radially confining same, said projections in the confined relation of said fingers overhanging and limiting upward movement of said piston, said certain fingers also including radially outward projections overlying said annular means and abutting against same on the upper face thereof, and others of said fingers being formed with abutments for expansion beneath and into abutting engagement with said annular means, said abutments and said outward projections cooperating with said annular means to prevent axial displacement thereof relative to the fingers.

References Cited in the file of this patent

UNITED STATES PATENTS

| | | |
|---|---|---|
| 2,158,318 | Bernhardt | May 16, 1939 |
| 2,299,450 | Anderson | Oct. 20, 1942 |